(No Model.) 3 Sheets—Sheet 1.

P. A. COUPAL.
LASTING MACHINE.

No. 317,308. Patented May 5, 1885.

Witnesses:
Chas. S. Gooding
R. J. Powers

Inventor:
P. A. Coupal
by Wright & Brown Attys (No Model.) 3 Sheets—Sheet 2.

P. A. COUPAL.
LASTING MACHINE.

No. 317,308. Patented May 5, 1885.

Fig. 3ᵃ. Fig. 3ᵇ.

WITNESSES:
Chas. S. Gooding.
R. J. Powers

INVENTOR:
P. A. Coupal
by Wight & Brown
Attys.

(No Model.) 3 Sheets—Sheet 3.
P. A. COUPAL.
LASTING MACHINE.

No. 317,308. Patented May 5, 1885.

WITNESSES:
Chas. S. Gooding
R. J. Powers

INVENTOR:
P. A. Coupal
Wight Brown
Atty

N. PETERS, Photo-Lithographer, Washington, D. C.

UNITED STATES PATENT OFFICE.

PETER A. COUPAL, OF BOSTON, MASS., ASSIGNOR, BY DIRECT AND MESNE ASSIGNMENTS, TO AUGUSTUS SEAVER, TRUSTEE, OF SAME PLACE.

LASTING-MACHINE.

SPECIFICATION forming part of Letters Patent No. 317,308, dated May 5, 1885.

Application filed February 24, 1885. (No model.)

*To all whom it may concern:*

Be it known that I, PETER A. COUPAL, of Boston, in the county of Suffolk and State of Massachusetts, have invented certain Improvements in Lasting-Machines, of which the following is a specification.

This invention has for its object to provide a machine for securing the edge of the upper of a boot or shoe to a flap cut in the outer surface of the inner sole, a metallic fastening being employed, which is formed and driven by the machine through said flap, and is clinched between the flap and the main portion of the inner sole by an anvil or clinching-plate forming a part of the machine and inserted under said flap.

The invention consists in the several improvements which I will now proceed to describe and claim.

Figures 1, 7, 8:
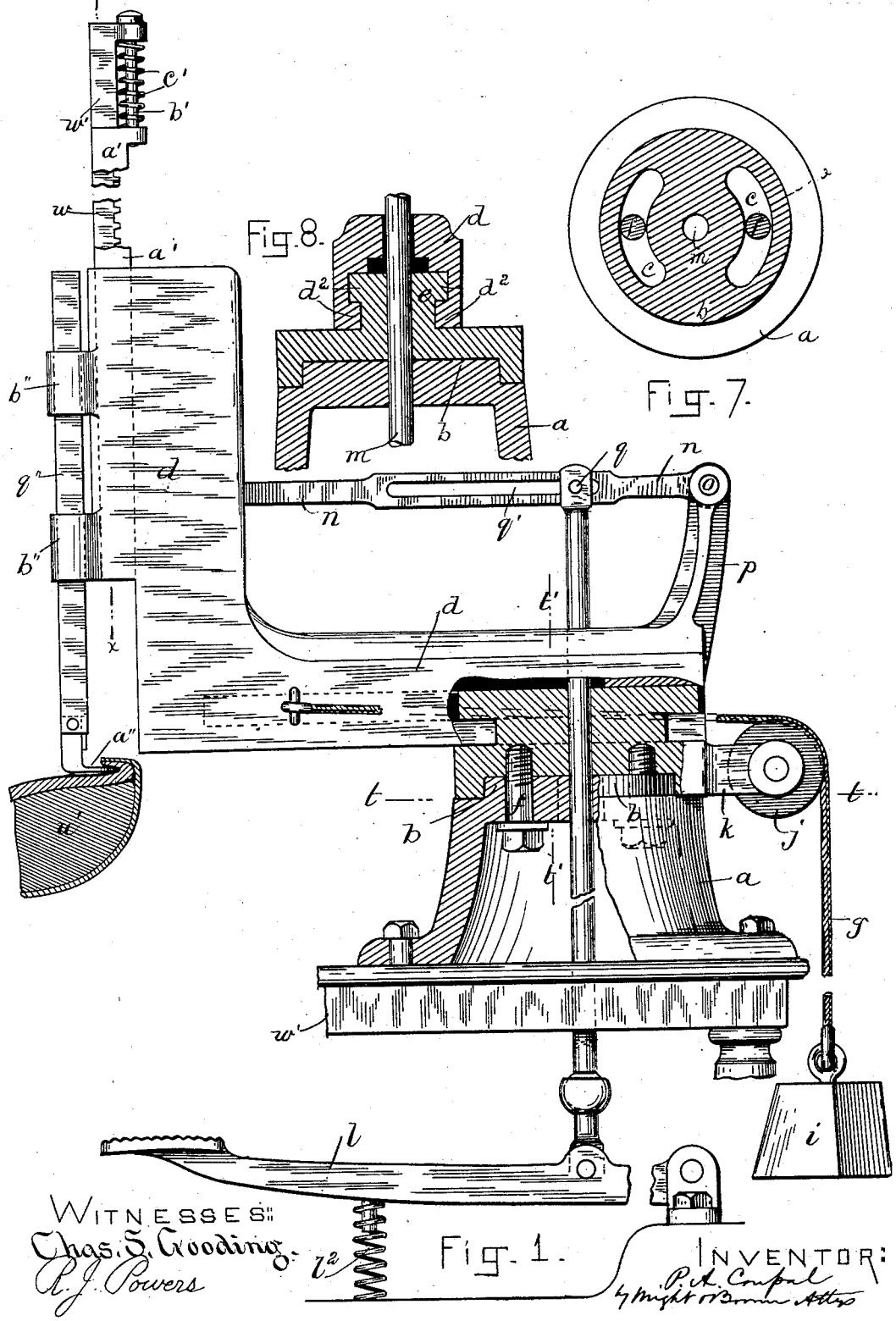
Figure 2:
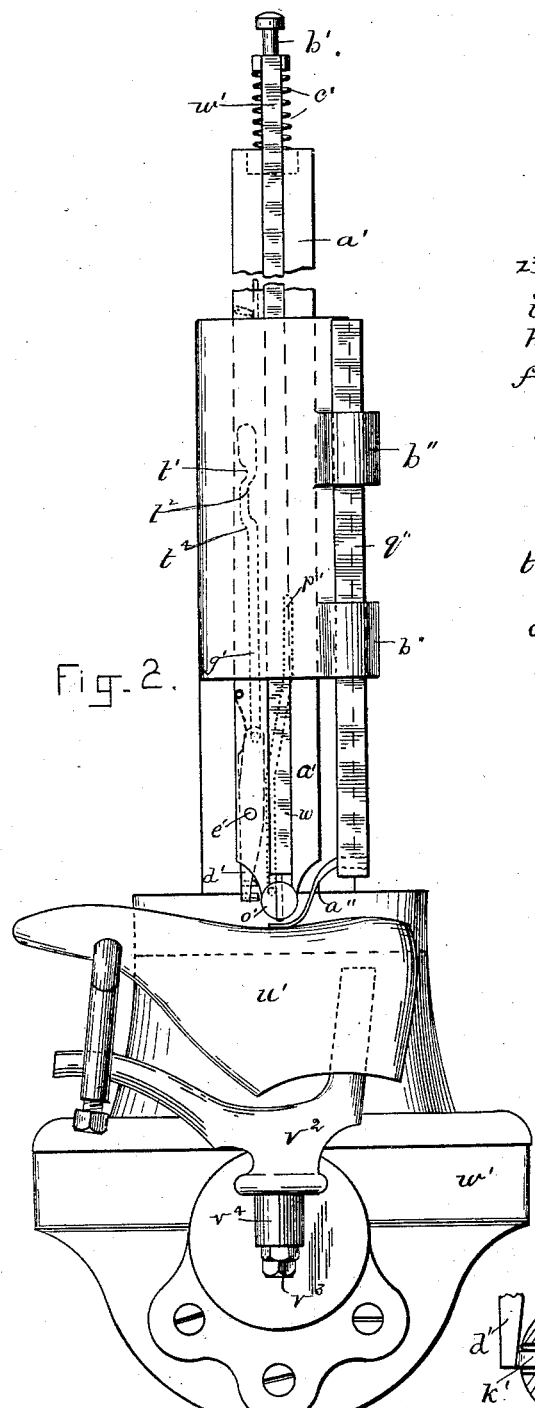
Figure 3:
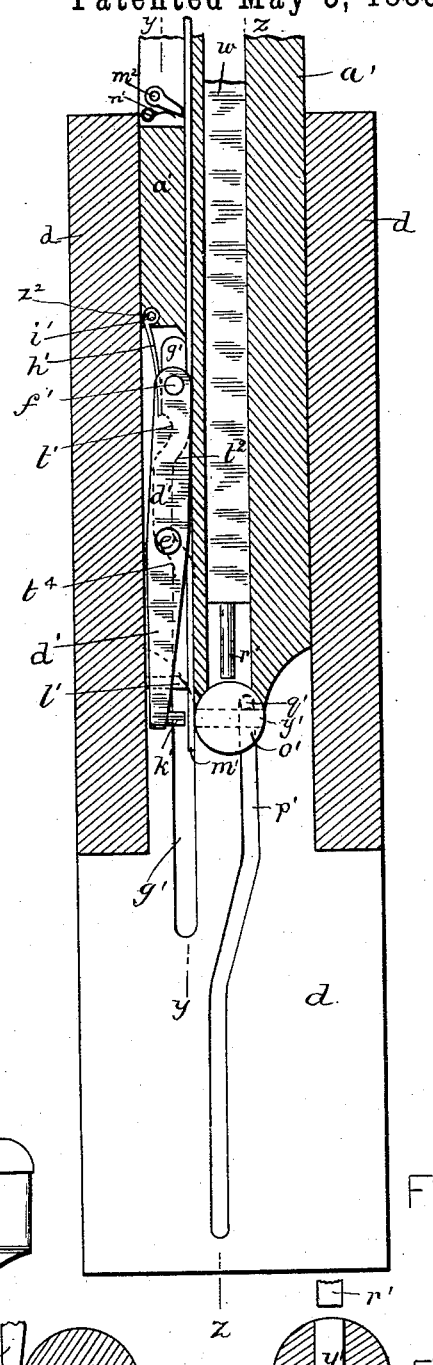
Figure 4:
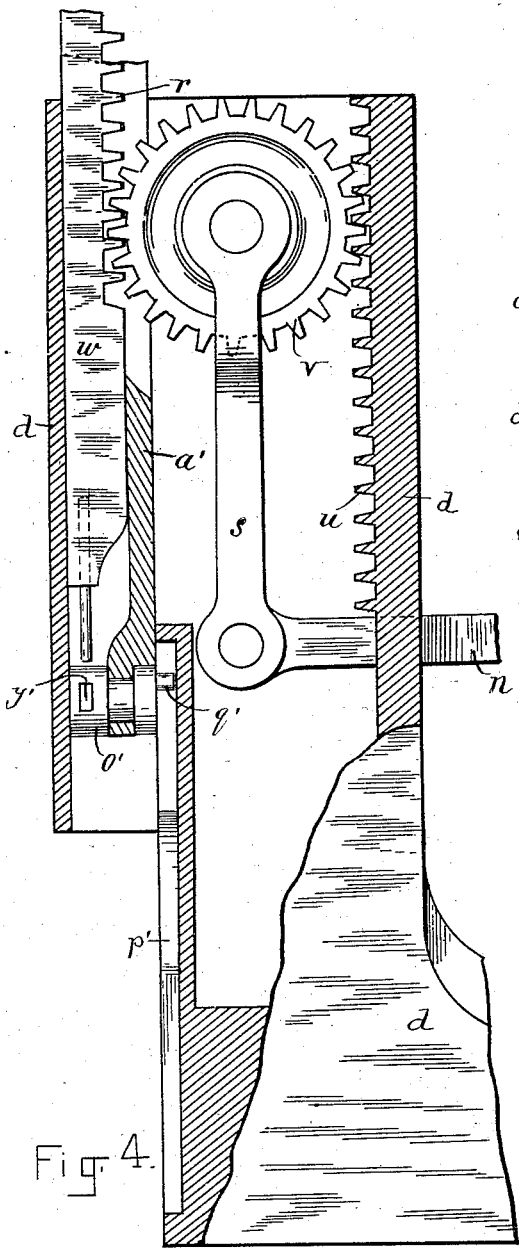
Figure 5:
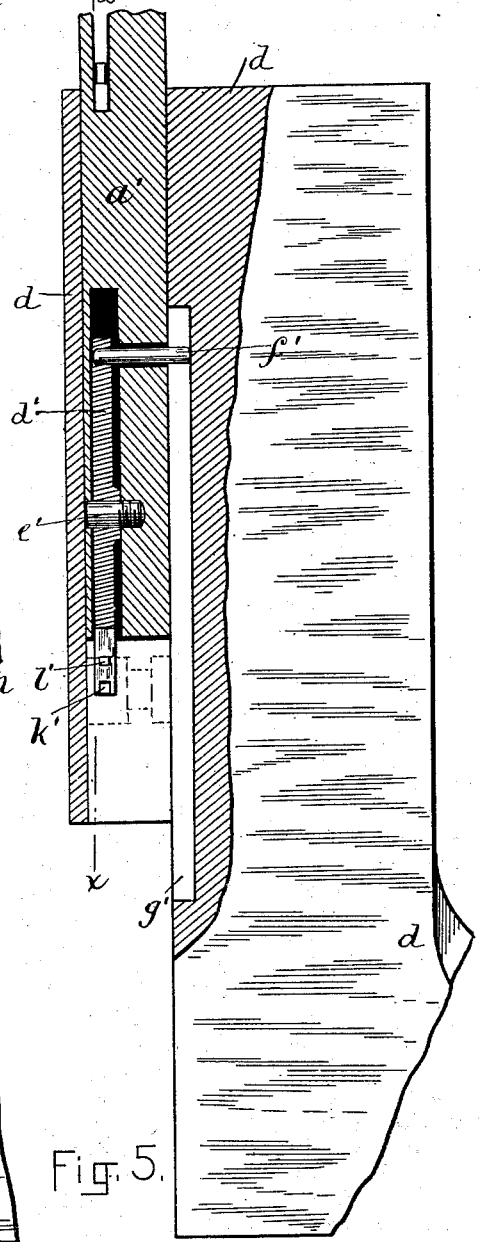
Figure 6:
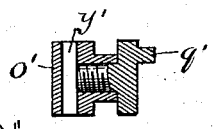

Of the accompanying drawings, forming a part of this specification, Figure 1 represents a side elevation and partial section of a lasting-machine embodying my invention. Fig. 2 represents a front elevation of the same. Fig. 3 represents an enlarged section taken on line $x\,x$, Fig. 1. Figs. $3^a$ and $3^b$ represent sectional views of the staple-forming devices in different positions. Fig. 4 represents a section taken on line $z\,z$, Fig. 3. Fig. 5 represents a section taken on line $y\,y$, Fig. 3. Fig. 6 represents a section of the portion of the machine in which the staple is formed. Fig. 7 represents a section on line $t\,t$, Fig. 1. Fig. 8 represents a section on line $t'\,t'$, Fig. 1.

The same letters of reference indicate the same parts in all the figures.

In the drawings, $a$ represents a pedestal or base rigidly secured to a suitable support, and provided at its upper end with a circular boss, $b$, on which is fitted to rotate a guide-block, $e$, the rotation of the latter being limited by segmental slots $c\,c$, Fig. 7, in the pedestal, and bolts $f\,f$, secured to the guide-block and passing through said slots, the heads of said bolts preventing the guide-block from being removed from the pedestal. In the opposite sides of the guide-block are guiding-grooves, which receive inwardly-projecting ears or lugs $d^2\,d^2$, formed on a frame, $d$, which supports the mechanism hereinafter described for forming, driving, and clinching the metallic fastenings. Said frame is adapted to slide horizontally in the guide-block, and to rotate with the guide-block on the pedestal, so that the position of the fastener forming, driving, and clinching devices can be varied by either of these movements or by a combination of them, at the will of the operator.

The frame is normally drawn backwardly toward the pedestal $a$ by a weight, $l$, connected to the frame by a cord, $g$, passing over a pulley, $j'$, journaled in ears $k$ on the guide-block.

The fastener forming, driving, and clinching devices supported by the frame $d$ are as follows:

$a'$ represents a carrier, which slides vertically in a guide or way formed in the frame $d$, and $w$ represents a driver-bar, which slides in a vertical way formed for it in the carrier $a'$.

To the upper end of the carrier is secured a stud, $b'$, which is encircled by a spring, $c'$, having its lower bearing on the carrier and its upper bearing on the driver-bar $w$.

The carrier, with the driver-bar, is reciprocated vertically in the frame $d$ by means of a treadle-lever, $l$, normally raised by a spring, $l^2$, a rod, $m$, pivoted to said lever, and passing vertically through the axial center of the pedestal $a$ and guide-block $e$ through a slot in the frame $d$, a lever, $n$, pivoted at $o$ to an arm, $p$, on the frame, and connected to the rod $m$ by a pin, $q$, passing through a slot, $q'$, in said lever, a pinion, $r$, meshing at one side with a vertical rack, $u$, formed in the frame $d$, and at the other side with a rack formed on the driver-bar $w$, and a rod, $s$, connecting said pinion with the lever $n$.

When the treadle $l$ is depressed by the operator's foot, the driver-bar $w$ is depressed with it by the described intermediate mechanism, and depresses the carrier $a'$ through the interposed spring $c'$; and when the treadle is released the spring $l^2$ raises it, and thus raises the driver-bar and carrier through the same intermediate mechanism.

A lever, $d'$, is pivoted to the carrier $a'$ at $e'$. In the upper end of this lever is a pin, $f'$, nected with the machine may be used instead of the clinching-plate $a^2$, as shown, for example, in the application of A. Seaver, filed January 19, 1885, Serial No. 153,259.

A spring may be used as an equivalent for the weight and cord in pulling back the frame $d$.

I do not limit myself to making the frame nominally movable, as described, as the jack may be made movable to such an extent that the frame may be fixed, and vice versa.

I claim—

1. In a machine for securing uppers to inner soles, the combination of a driver and mechanism to operate it, mechanism, substantially as described, for supplying sole-fasteners to the driver, a frame supporting said driver and fastener-supplying mechanism, means, substantially as described, whereby said frame is enabled to reciprocate and oscillate horizontally, and a jack swiveled to rotate horizontally, as set forth.

2. In a machine for securing uppers to externally-channeled inner soles, the combination of a driver and mechanism to operate it, a frame supporting said driver, mechanism, substantially as described, for supplying fasteners to the driver, and a clinching-plate supported by said frame, as set forth.

3. In a machine for securing uppers to externally-channeled inner soles, the combination of a driver and mechanism for operating it, mechanism, substantially as described, for supplying fasteners to the driver, a movable frame supporting said driver and fastener-supplying mechanism, means, substantially as described, whereby said frame is permitted to reciprocate and oscillate horizontally, a swiveled jack, on which the sole and upper are supported, and a clinching-plate attached to the frame and adapted to be inserted in the channel of the sole, as set forth.

4. In a machine for securing uppers to externally-channeled inner soles, the combination of a driver and mechanism for operating it, means for supplying fasteners to said driver, a movable frame supporting said driver, a clinching plate or anvil supported and moved by said frame and adapted to be engaged with the flap of the inner sole, a swiveled jack supporting the inner sole and upper, and means, as specified, for exerting pressure on said frame, and thereby holding the clinching-plate in engagement with the inner sole, as set forth.

5. The fastener or staple forming devices composed of the rotary block or female former, the male former, the cutter, and mechanism, substantially as described, whereby said former and cutter are operated, combined with the driver and its operating mechanism.

6. The combination of the supporting-frame, the carrier adapted to reciprocate vertically therein and provided at its lower end with the rotary disk or female former, the lever pivoted to said carrier, and provided with the cutter and male former, the driver-bar having a yielding spring-connection with the carrier, mechanism, substantially as described, for reciprocating the carrier and driver-bar, and devices, substantially as described, whereby when the carrier is depressed the cutter and formers are operated to make a staple, and the female former is turned to present the staple to the descending driver, as set forth.

7. The combination of the supporting-frame, the driver-bar adapted to reciprocate vertically therein, mechanism, substantially as described, whereby the driver-bar is positively operated, the carrier having the staple cutting, forming, and presenting devices, the means for operating said devices, and a spring interposed between the driver and carrier, whereby the carrier is enabled to stop and present the staple to the driver while the latter is completing its downward movement, as set forth.

8. The combination, substantially as set forth, of the pedestal or support, the guide-block fitted to partly rotate thereon, the frame adapted to slide on and rotate with the guide-block, the driver and the clinching-plate supported by the frame, operating mechanism, substantially as described, for the driver, and the swiveled jack or last-support.

9. The combination, substantially as set forth, of the pedestal or support, the guide-block fitted to partly rotate thereon, the frame adapted to slide on and rotate with the guide-block, the driver, and the clinching-plate supported by the frame, the swiveled jack, and the weight or its specified equivalent, whereby the frame is normally moved away from the jack, as set forth.

10. The combination of the pedestal or support, the swiveled guide-block, the frame adapted to slide on and rotate with the guide-block, the staple forming and driving mechanism supported by said frame, the treadle located below the pedestal, the connecting-rod passing from the treadle through the axial center of the swiveled guide-block, the spring whereby the treadle and rod are normally raised, and the intermediate devices whereby the movements of the treadle and rod are communicated to the driver, as set forth.

In testimony whereof I have signed my name to this specification, in the presence of two subscribing witnesses, this 18th day of February, 1885.

PETER A. COUPAL.

Witnesses:
C. F. BROWN,
R. J. POWERS.